(12) United States Patent
Lee et al.

(10) Patent No.: US 10,790,626 B2
(45) Date of Patent: Sep. 29, 2020

(54) BUSBAR ASSEMBLY AND MOTOR COMPRISING SAME

(71) Applicant: LG INNOTEK CO., LTD., Seoul (KR)

(72) Inventors: Jung Kyu Lee, Seoul (KR); Hee Soo Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/081,664

(22) PCT Filed: Mar. 2, 2017

(86) PCT No.: PCT/KR2017/002255
§ 371 (c)(1),
(2) Date: Aug. 31, 2018

(87) PCT Pub. No.: WO2017/150909
PCT Pub. Date: Sep. 8, 2017

(65) Prior Publication Data
US 2019/0089108 A1    Mar. 21, 2019

(30) Foreign Application Priority Data

Mar. 2, 2016   (KR) .................. 10-2016-0025260
May 13, 2016   (KR) .................. 10-2016-0058838

(51) Int. Cl.
  *H02K 5/22*   (2006.01)
  *H01R 25/16*  (2006.01)
  *H02K 3/52*   (2006.01)

(52) U.S. Cl.
  CPC ........... *H01R 25/162* (2013.01); *H02K 3/522* (2013.01); *H02K 5/225* (2013.01)

(58) Field of Classification Search
  CPC ...... H02K 5/225; H01R 25/16; H01R 25/161; H01R 25/162
  See application file for complete search history.

(56) References Cited

U.S. PATENT DOCUMENTS 6,914,356 B2 *  7/2005  Yamamura ............... H02K 3/50
                                                 310/71
7,936,099 B2 *  5/2011  Staudemann ............ H02K 3/28
                                                 310/180
(Continued)

FOREIGN PATENT DOCUMENTS

CN       1808851 A      7/2006
CN     104753196 A      7/2015
(Continued)

*Primary Examiner* — Edwin A. Leon
*Assistant Examiner* — Milagros Jeancharles
(74) *Attorney, Agent, or Firm* — Birch, Stewart, Kolasch & Birch, LLP

(57) ABSTRACT

Provided is a busbar assembly including a busbar body having an inner radius and an outer radius, and a plurality of terminals coupled to the busbar body and including bodies and electrodes, wherein all the electrodes of the plurality of the terminals are disposed between the inner radius and the outer radius, the plurality of the terminals are disposed at the same height, and at least two terminals among the plurality of the terminals are disposed at different locations around a center of the busbar body in radial and circumferential directions. Thus, an advantageous effect is provided in that a manufacturing cost may be reduced by significantly reducing an amount of generated scrap.

16 Claims, 22 Drawing Sheets

(56) References Cited

U.S. PATENT DOCUMENTS

| | | | | |
|---|---|---|---|---|
| 7,948,130 B2* | 5/2011 | Kitagawa | ................ | H02K 3/522 310/71 |
| 8,339,001 B2* | 12/2012 | Ghodsi-Khameneh | ...................... | H02K 3/28 310/71 |
| 8,493,677 B2* | 7/2013 | Imai | ....................... | G02B 7/022 359/811 |
| 8,519,583 B2* | 8/2013 | Sakaue | ................. | H02K 3/522 310/184 |
| 8,816,550 B2* | 8/2014 | Kim | ..................... | B62D 5/0403 310/71 |
| 9,490,675 B2* | 11/2016 | Kim | ......................... | H02K 3/34 |
| 9,735,639 B2* | 8/2017 | Shim | ....................... | H02K 3/28 |
| 10,050,483 B2* | 8/2018 | Sambuichi | ............. | H02K 3/522 |
| 2006/0138883 A1 | 6/2006 | Yagai et al. | | |
| 2009/0039720 A1* | 2/2009 | Tsukashima | ........... | H02K 3/522 310/71 |
| 2011/0156512 A1* | 6/2011 | Shimomura | ........... | H02K 1/148 310/71 |
| 2013/0113313 A1* | 5/2013 | Ikura | ...................... | H02K 3/522 310/71 |
| 2014/0375153 A1 | 12/2014 | Suzuki | | |
| 2015/0076944 A1 | 3/2015 | Shim et al. | | |
| 2015/0188377 A1 | 7/2015 | Kim et al. | | |
| 2017/0366060 A1* | 12/2017 | Haberkorn | ............... | H02K 3/28 |
| 2018/0316238 A1* | 11/2018 | Kong | ................... | B62D 5/0403 |
| 2020/0014272 A1* | 1/2020 | Asahi | ..................... | H02K 3/522 |

FOREIGN PATENT DOCUMENTS

| | | |
|---|---|---|
| JP | 2003-37958 A | 2/2003 |
| JP | 2006-187175 A | 7/2006 |
| JP | 2007-89357 A | 4/2007 |
| JP | 2015-6116 A | 1/2015 |
| KR | 10-2013-0057149 A | 5/2013 |

* cited by examiner

【Fig. 1】(200)
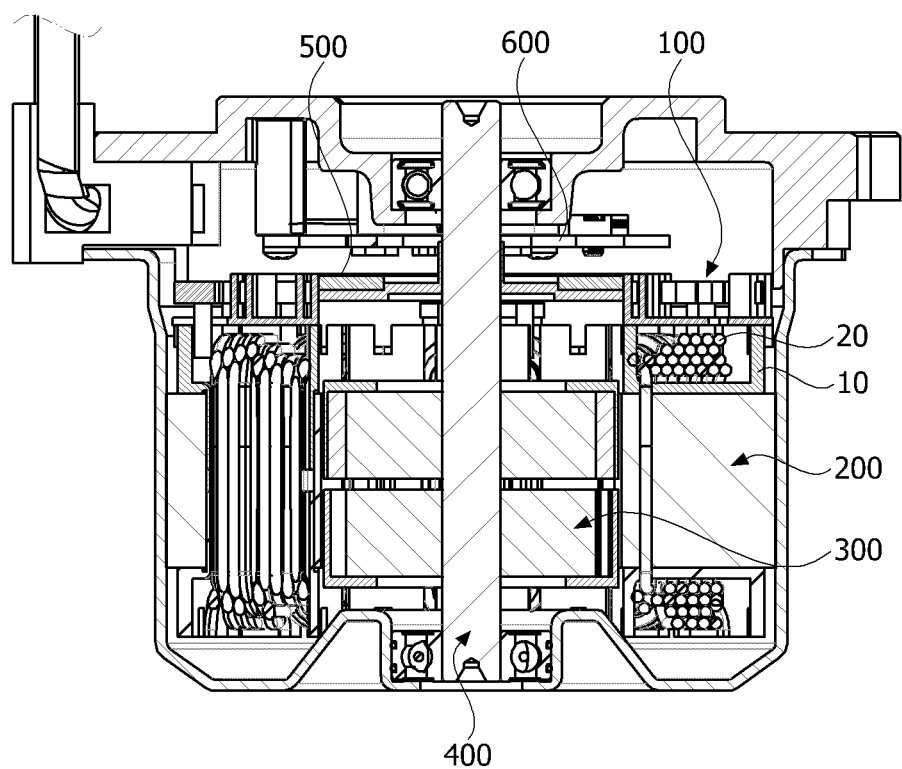

[Fig.2]
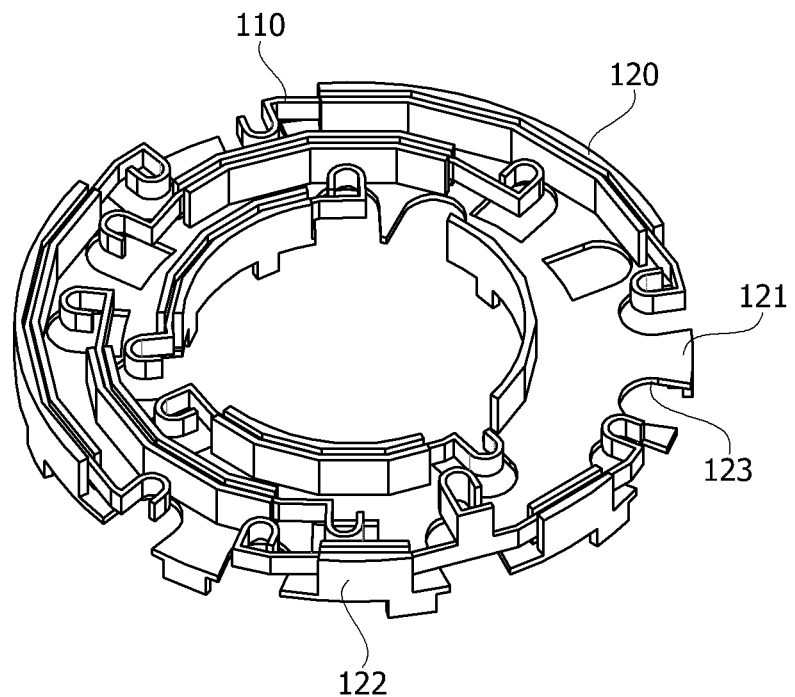

[Fig.3]
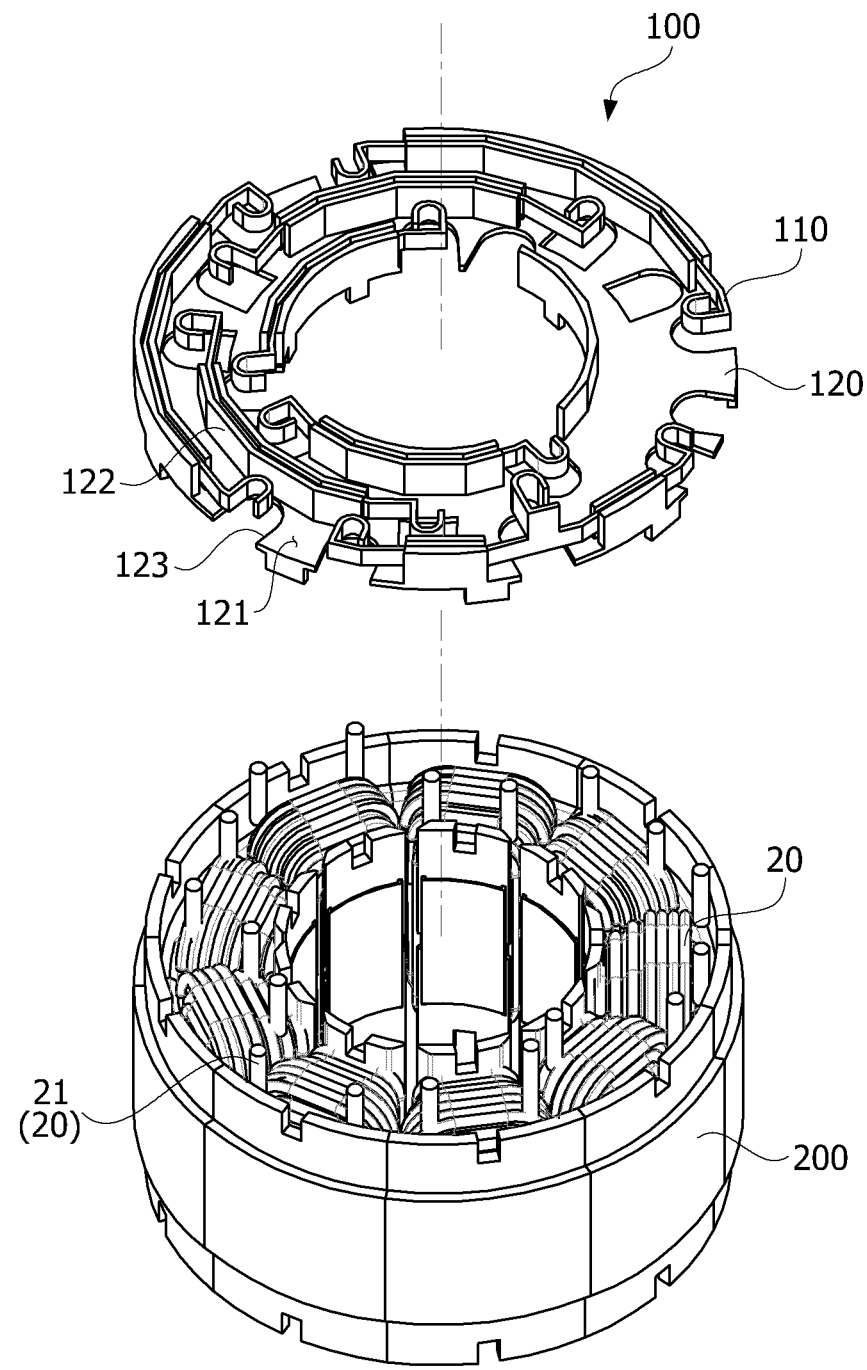

[Fig.4]
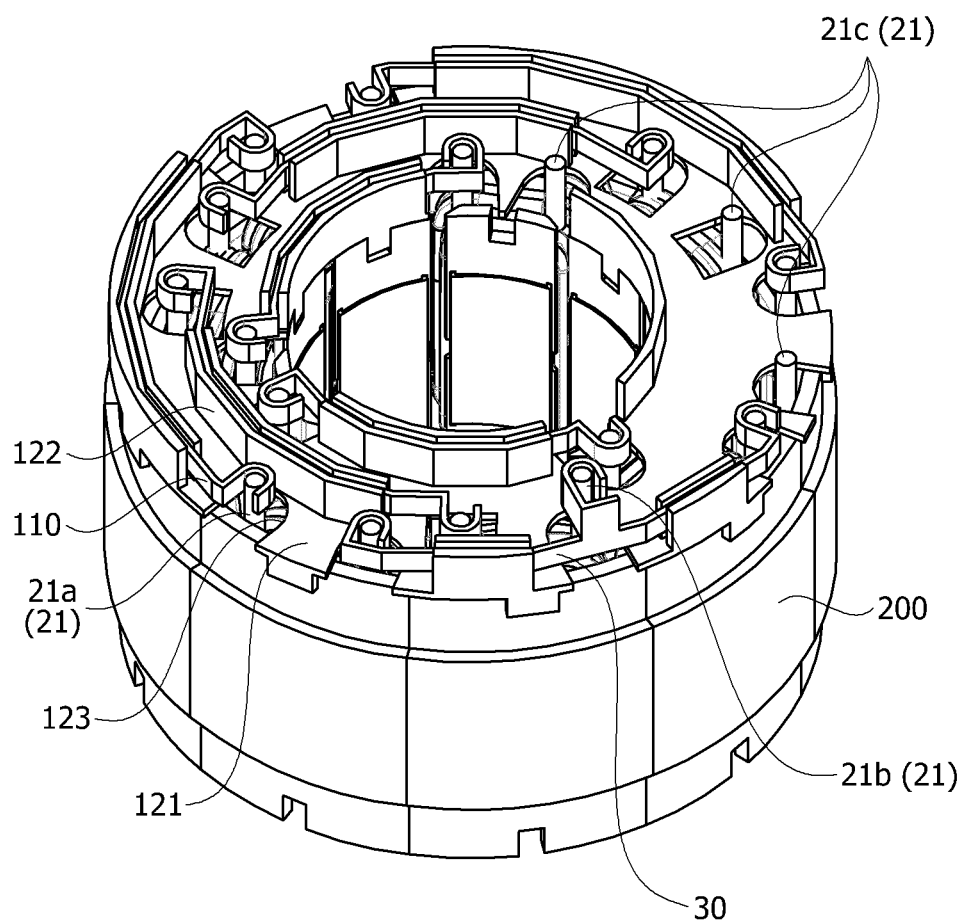

[Fig.5]
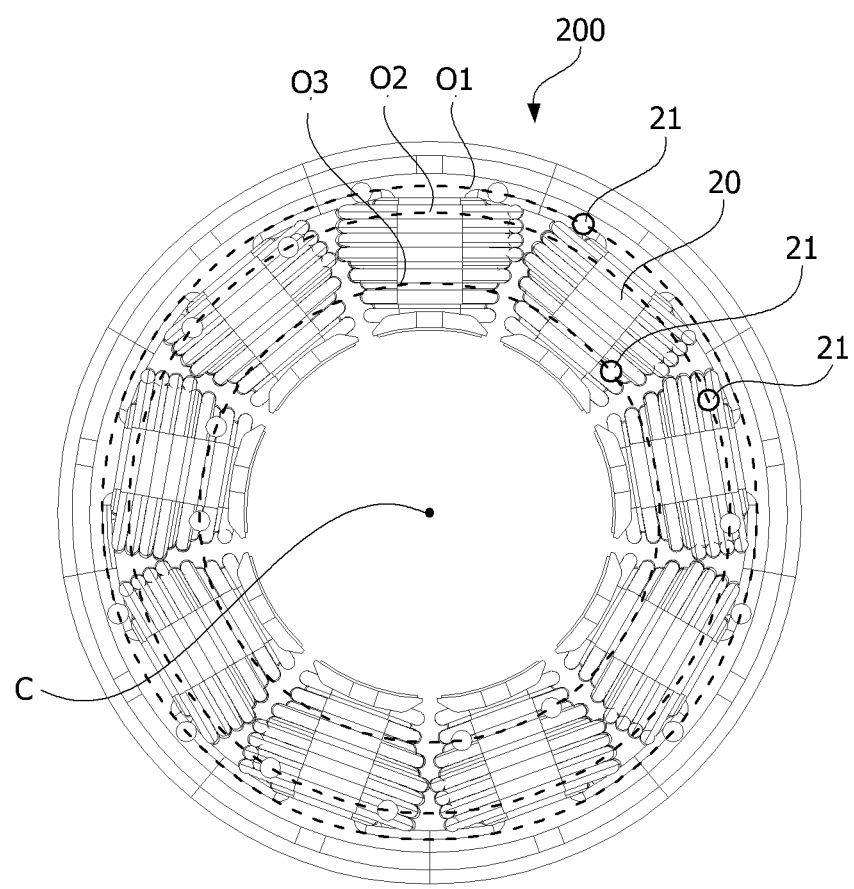

[Fig.6]
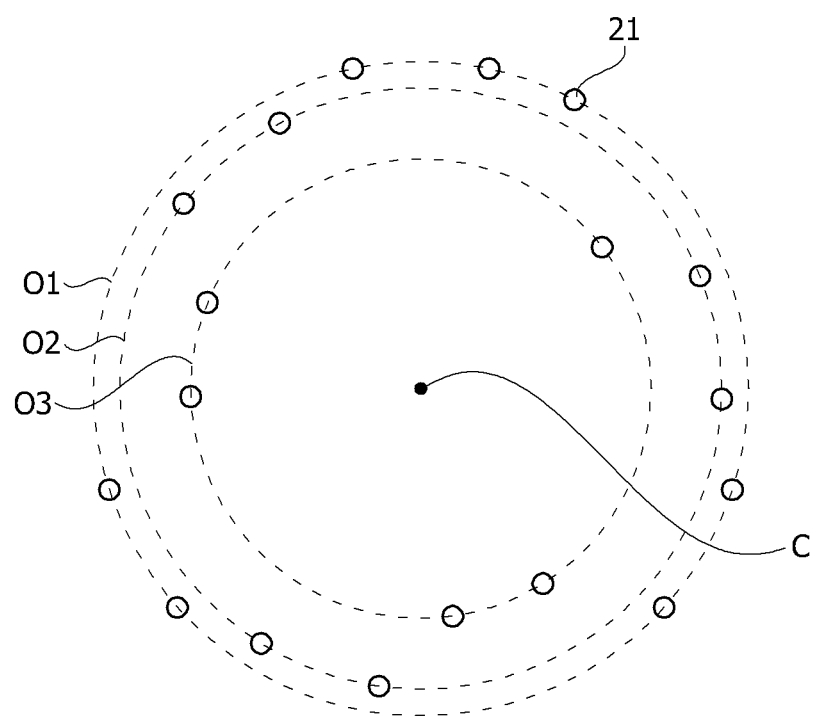

[Fig.7]
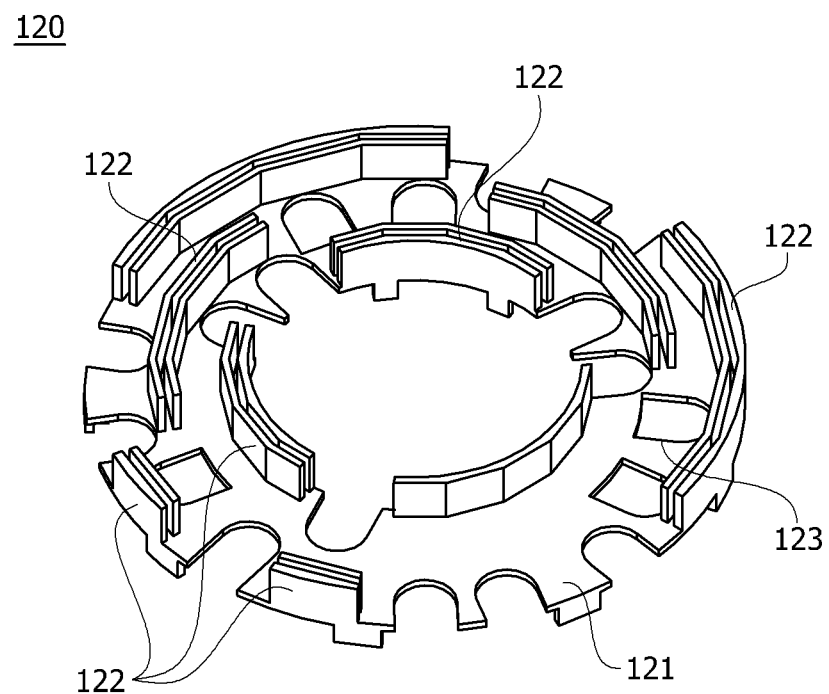

[Fig.8]
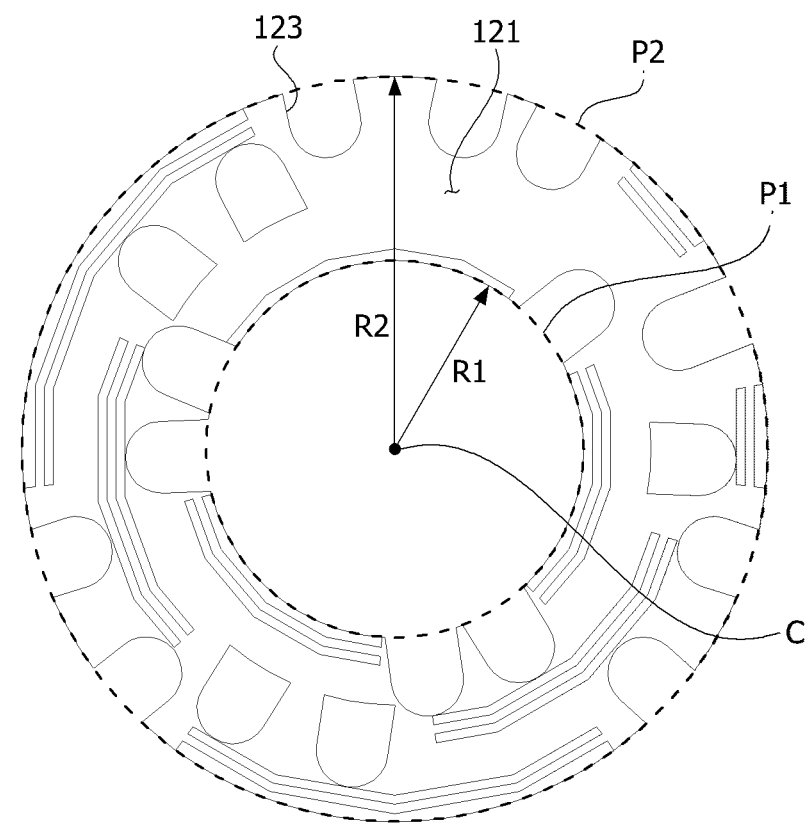

[Fig.9]
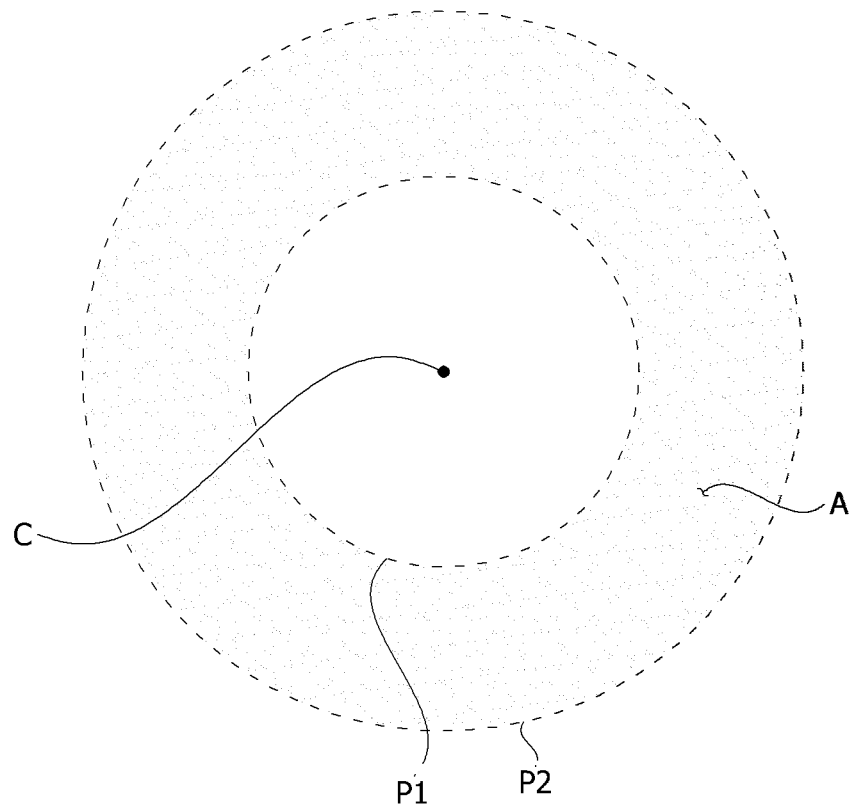

[Fig.10]
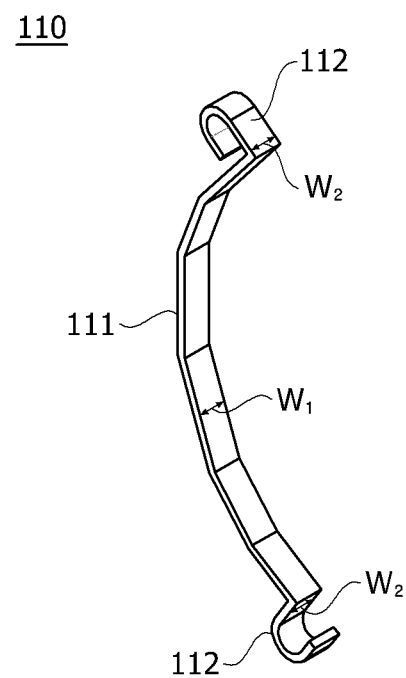

【Fig. 11】A->W
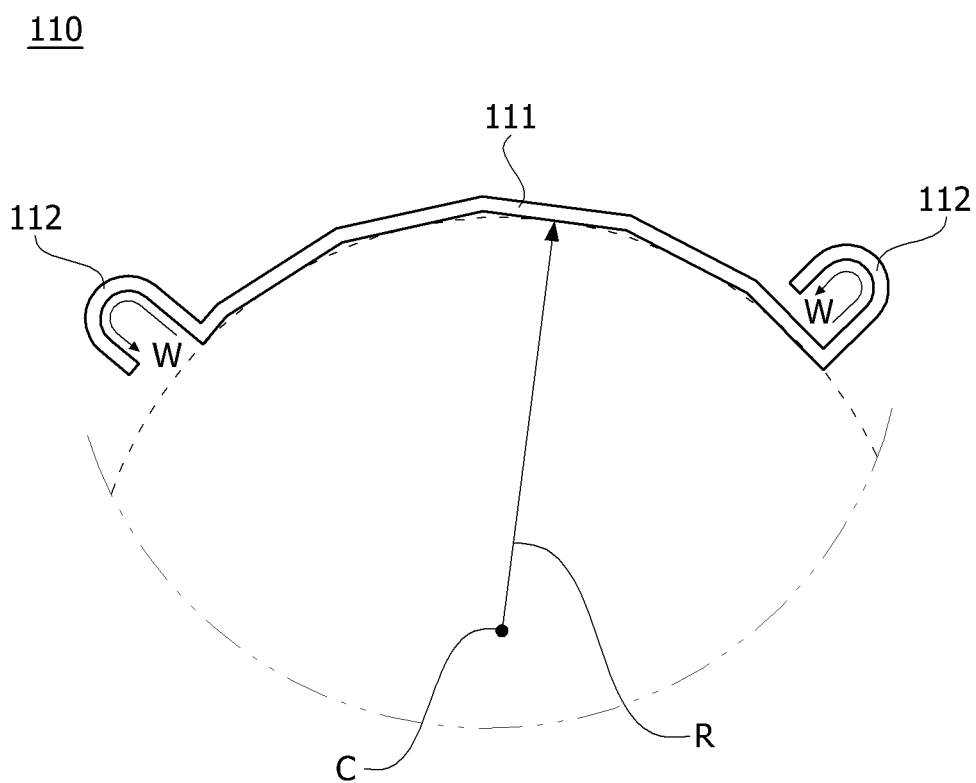

[Fig.12]
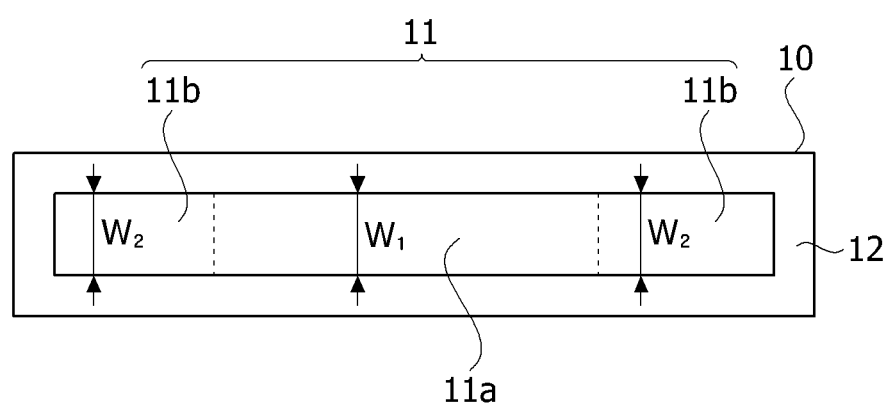

[Fig.13]
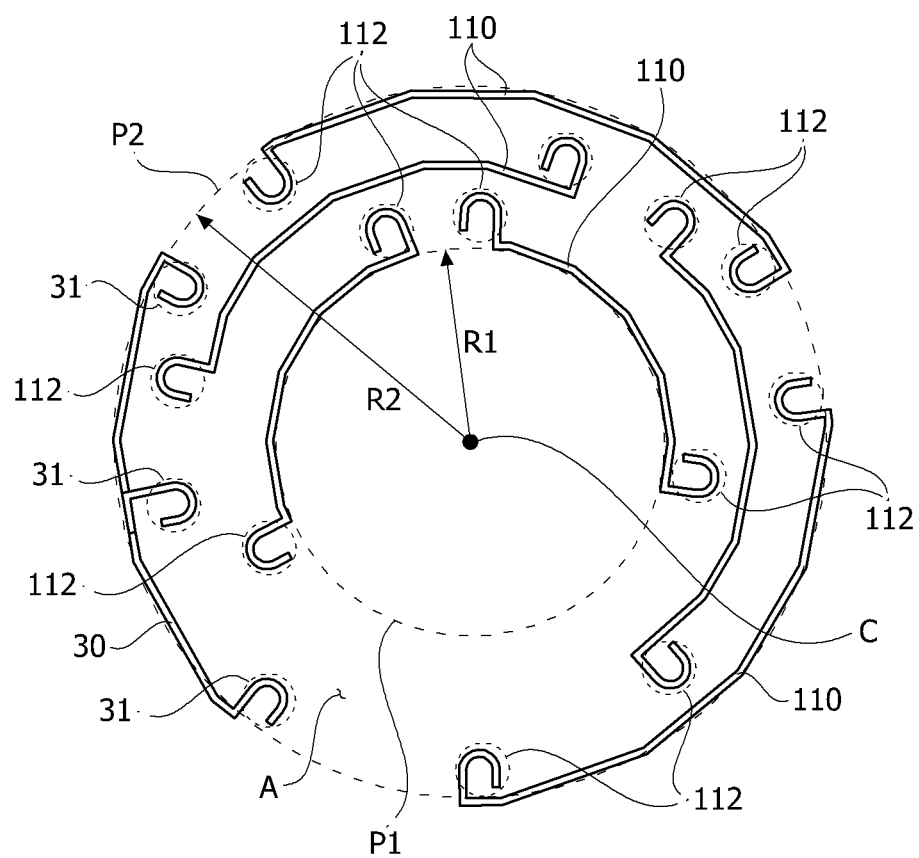

[Fig.14]
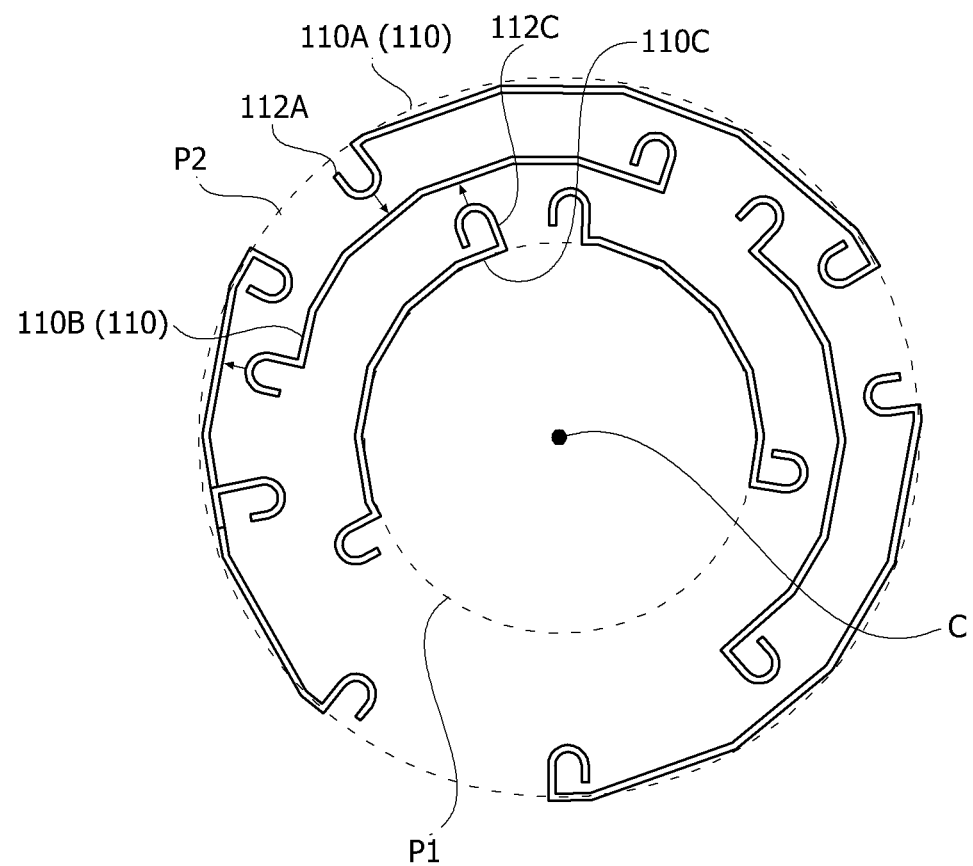

[Fig.15]
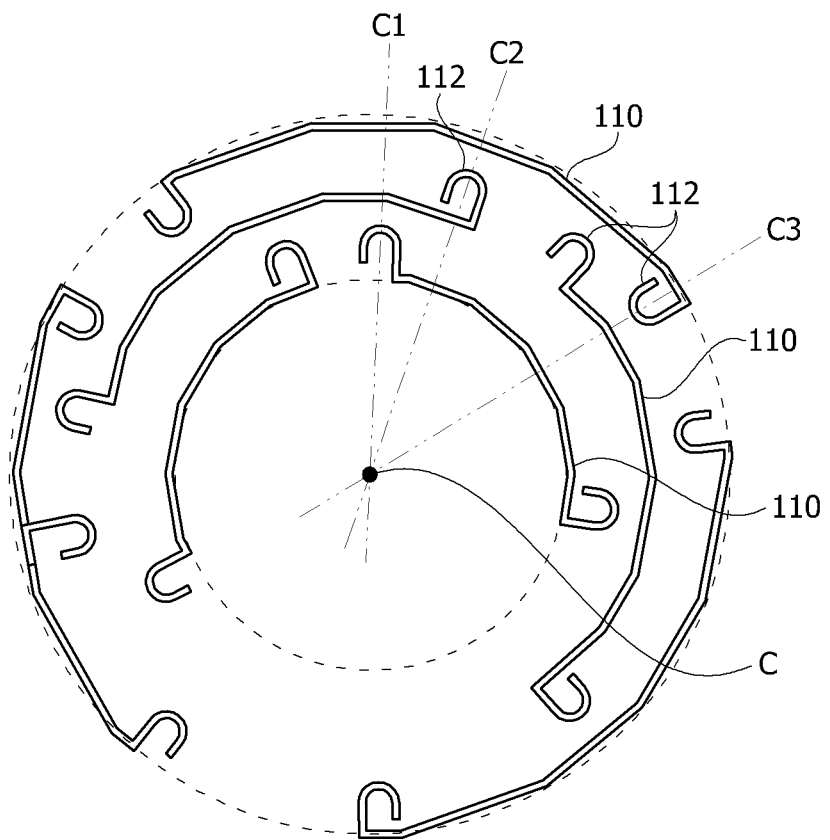

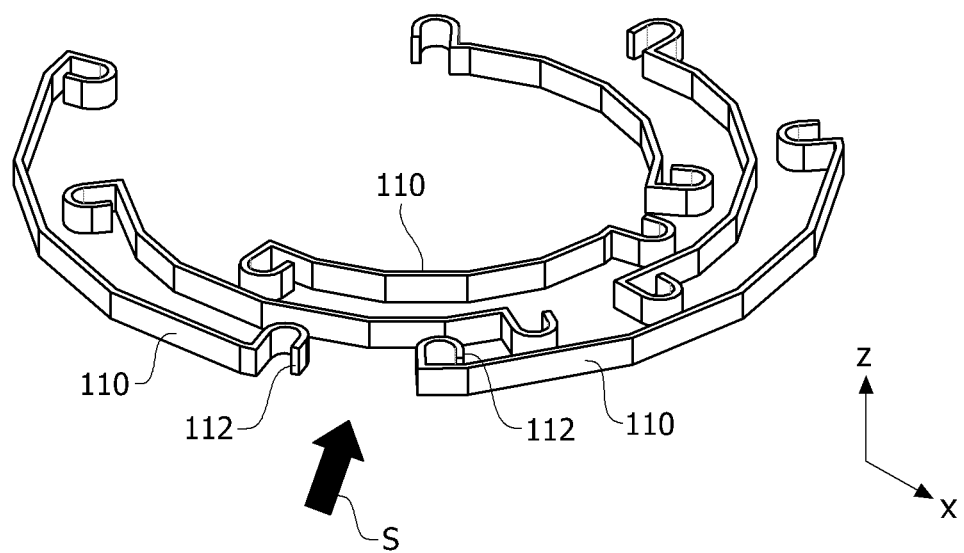
[Fig.16]

[Fig.17]
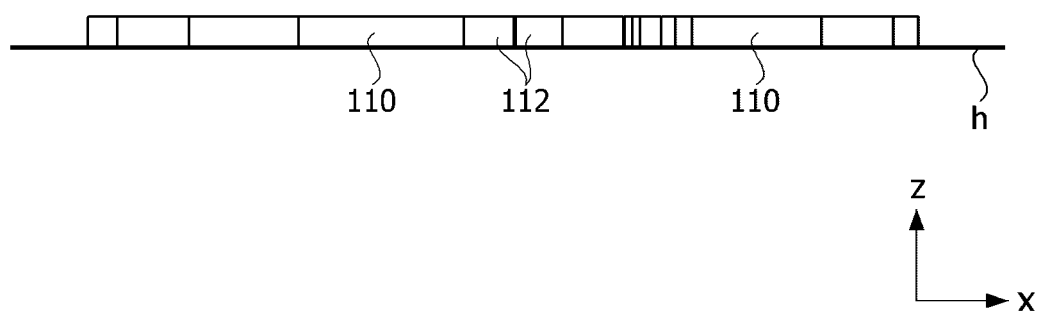

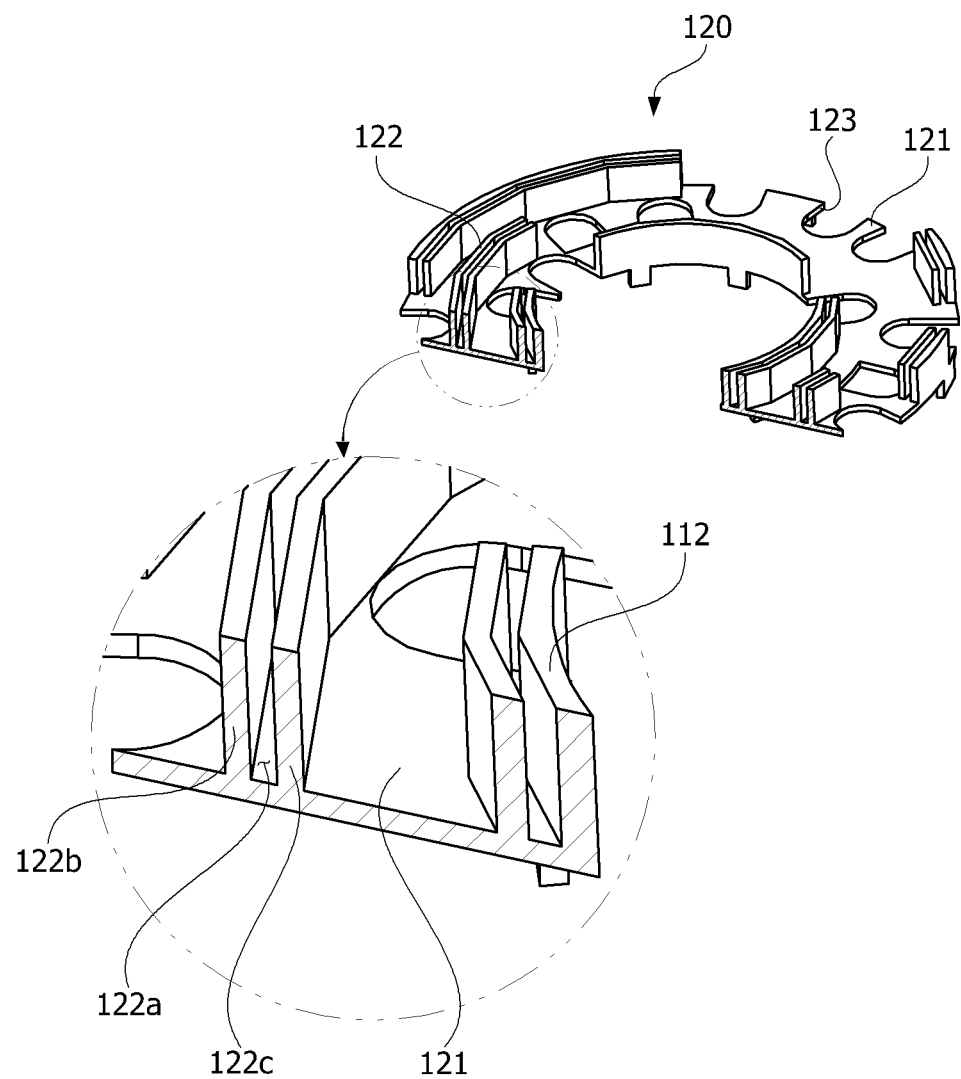
[Fig.18]

[Fig.19]
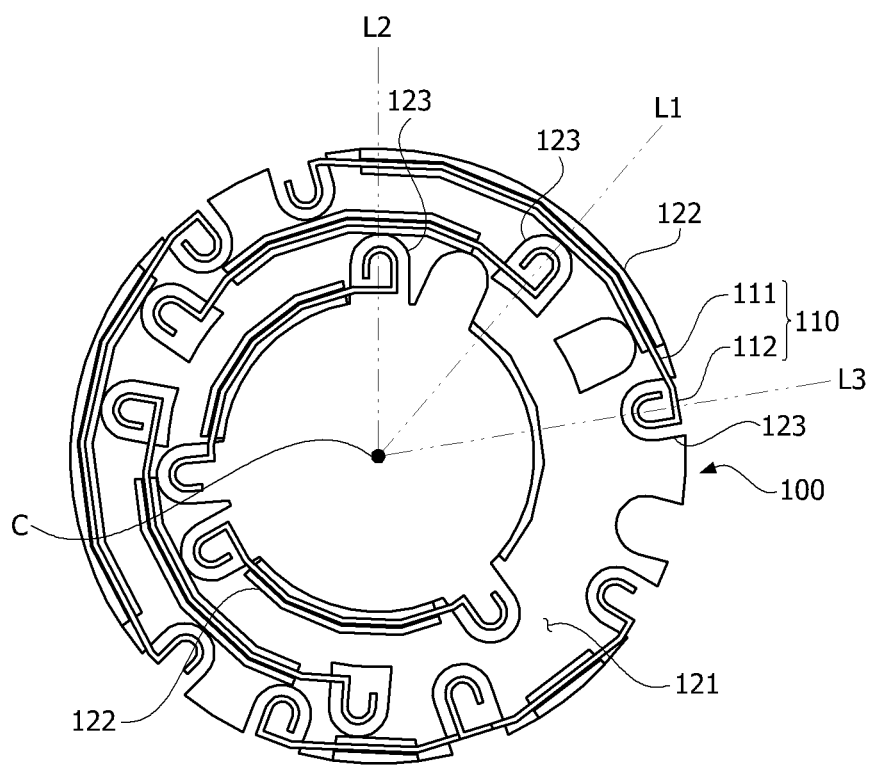

[Fig.20]
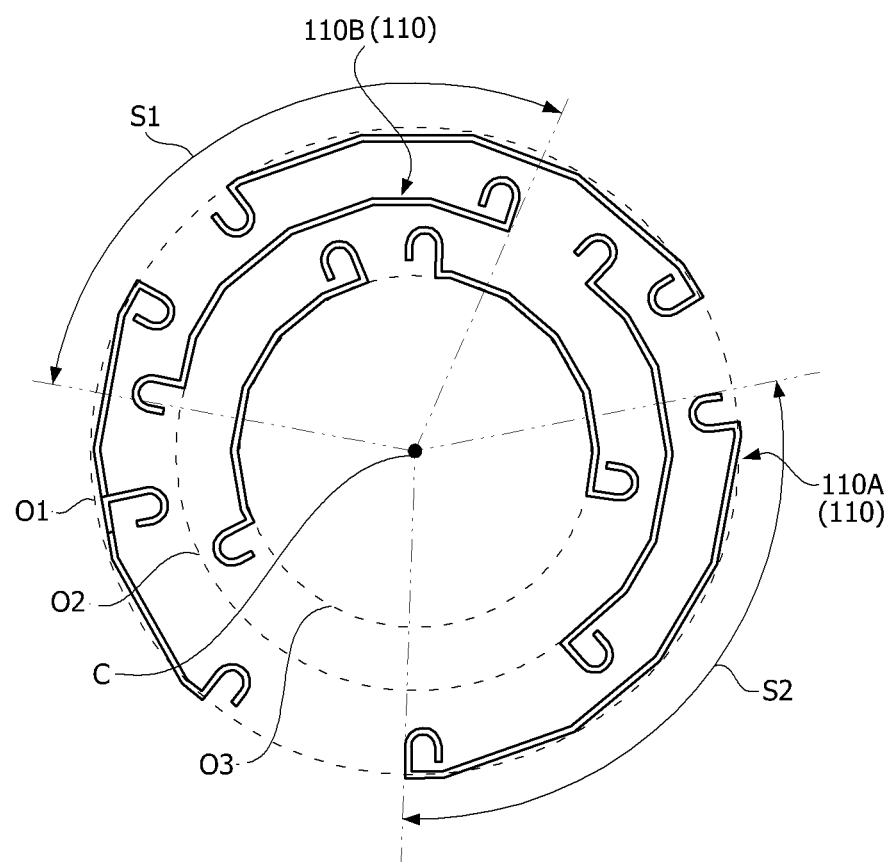

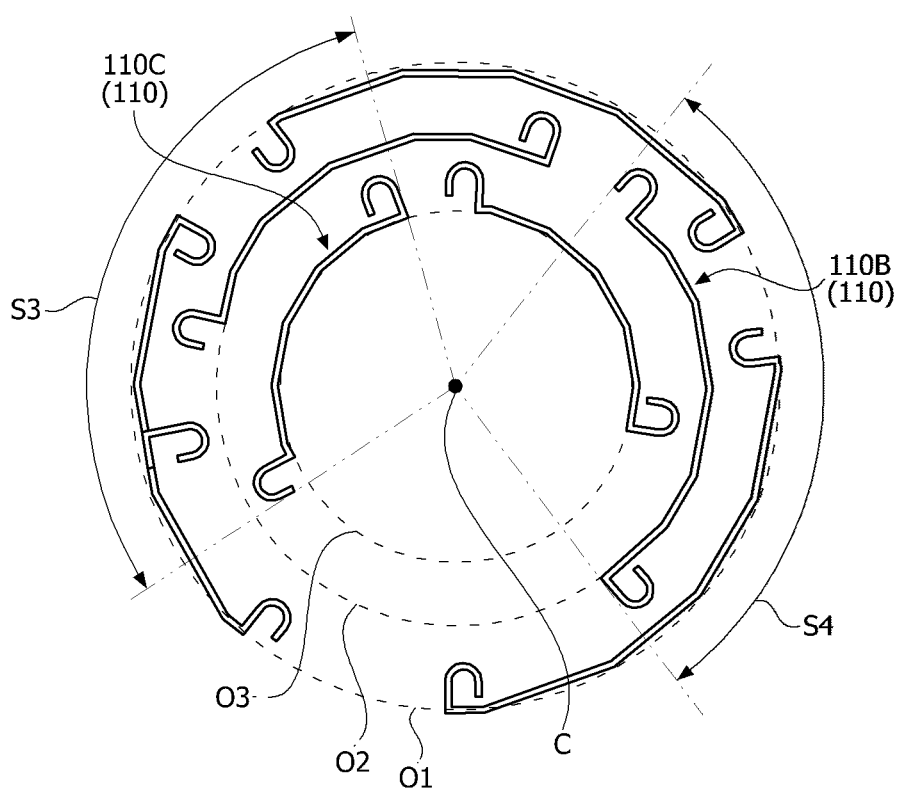
[Fig.21]

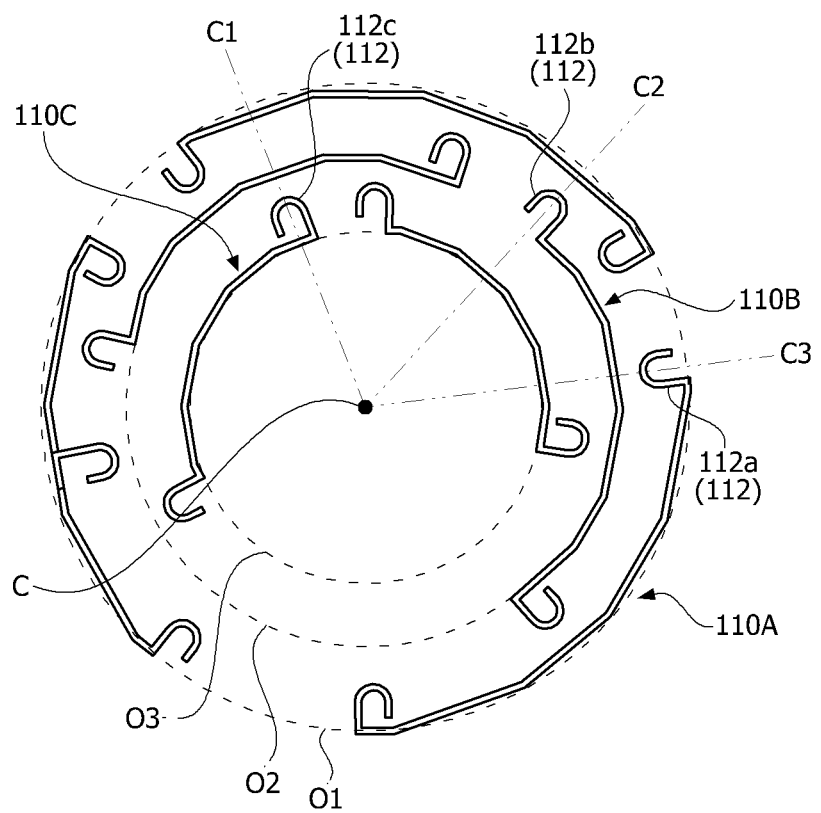
[Fig.22]

BUSBAR ASSEMBLY AND MOTOR COMPRISING SAME

CROSS REFERENCE TO RELATED APPLICATIONS

This application is the National Phase of PCT International Application No. PCT/KR2017/002255, filed on Mar. 2, 2017, which claims priority under 35 U.S.C. 119(a) to Patent Application Nos. 10-2016-0025260, filed in the Republic of Korea on Mar. 2, 2016 and 10-2016-0058838, filed in the Republic of Korea on May 13, 2016, all of which are hereby expressly incorporated by reference into the present application.

TECHNICAL FIELD

The present invention relates to a busbar assembly and a motor including the same.

BACKGROUND ART

In a motor, a rotational shaft formed to be rotatable, a rotor coupled to the rotational shaft, and a stator fixed to an inside of a housing are provided, and the stator is installed along a circumference of the rotor to have a gap between the rotor and the stator. In addition, coils configured to generate rotational magnetic fields are wound around the stator to induce an electrical interaction with the rotor to rotate the rotor.

Busbars electrically connected to the coils are disposed at an upper end of the stator. The busbars generally include busbar housings having a ring shape and busbar terminals coupled to the busbar housings to be connected to the coils. Generally, the busbar terminal of the busbar is formed by pressing sheet metal such as a copper plate.

Here, a plurality of electrodes directly connected to the coils may be provided on the busbar terminals, and each of the electrodes may be formed to be bent due to spatial limitation or a location of a connection end of the coil. Due to a shape of the electrode, there are problems in that a size of a mold increases, and an amount of scrap discarded after forming the electrode significantly increases.

As a result, there are problems in that a loss rate of raw material is large and a large amount of cost and effort are needed to manufacture a mold.

Technical Problem

The present invention is directed to providing a busbar assembly with which an amount of scrap may be decreased and a motor including the same.

In addition, the present invention is also directed to providing a busbar assembly with which an amount of material thereof may be decreased, a motor, and a vehicle including the same.

Objectives to be achieved through embodiments are not limited to the above-described objectives, and other objectives which are not described above will be clearly understood to those skilled in the art.

Technical Solution

One aspect of the present invention provides a busbar assembly including: a busbar body having an inner radius and an outer radius; and a plurality of terminals coupled to the busbar body and including bodies and electrodes, wherein all the electrodes of the plurality of the terminals are disposed between the inner radius and the outer radius.

Another aspect of the present invention provides a busbar assembly includes a busbar body, a plurality of terminals coupled to the busbar body and including bodies and electrodes, wherein the plurality of the terminals are disposed at the same height, and at least two terminals among the plurality of the terminals are disposed at different locations around a center of the busbar body in radial and circumferential directions.

Still another aspect of the present invention provides a busbar assembly including a busbar body, and a plurality of terminals coupled to the busbar body and including bodies and electrodes, wherein the plurality of the terminals are disposed at the same height, and at least two terminals among the plurality of the terminals are disposed at different locations around a center of the busbar body in a radial direction.

The busbar body may include at least one electrode hole.

The electrode hole may be disposed below the electrode of the terminal.

The electrode hole may be disposed around the center of the busbar body in the circumferential direction at a location corresponding to the electrode of the terminal.

All the electrodes of the plurality of the terminals may be disposed at different locations around the center of the busbar body in the circumferential direction.

The body may have a belt shape, and the electrode may have a hook shape in which both end portions of the body extend in longitudinal directions of the body and are bent.

The electrodes formed at the both end portions of the body may have the same shape.

The electrodes formed at the both end portions of the body may be formed to be bent in the same direction.

At least one electrode among a plurality of the electrodes may protrude inward toward the center of the busbar in the radial direction.

The electrode disposed at an outermost side around the center of the busbar in the radial direction may protrude inward.

At least one electrode among the plurality of the electrodes may protrude toward the outside from the center of the busbar in the radial direction.

The electrode disposed at an innermost side around the center of the busbar in the radial direction may protrude toward the outside.

A width of the body may be the same as that of the electrode.

The busbar body may include a base in which the electrode hole is formed and a terminal holder which is formed on the base and into which the body of the terminal is inserted.

All the electrodes of the plurality of the terminals may be disposed at the same height.

All the electrodes may be coplanar.

The busbar body may include an inner radius and an outer radius, and all the electrodes of the plurality of the terminals may be disposed between the inner radius and the outer radius.

Yet another aspect of the present invention provides a motor including the busbar assembly, a stator including a coil connected to the busbar assembly, a rotor disposed inside the stator, and a rotational shaft coupled to the rotor.

Advantageous Effects

As described above, since a terminal of a busbar is formed using sheet metal having a belt shape which does not have divided portions, an amount of generated scrap is significantly decreased, and thus there is an advantageous effect in that a manufacturing cost is reduced.

Since a busbar assembly is configured such that electrodes of all terminals are disposed between inner and outer radii of a busbar body, a plurality of terminals can be disposed in a single layer, and thus there are advantageous effects in that a shape of the terminal can be simplified, and a manufacturing cost of the busbar assembly can be significantly reduced.

Since a terminal holder configured to fix only the belt-shaped body of the terminal is provided, a mold material forming the busbar body can be reduced, and thus there is an advantageous effect in that a manufacturing cost is reduced.

Since the plurality of terminals are disposed at different locations at the same height in circumferential and radial directions, there are advantageous effects in that the shape of the terminal can be simplified, and the manufacturing cost of the busbar assembly can be significantly reduced.

Since the electrodes of the terminals can be disposed to be coplanar at different locations in the radial direction, heights of the busbars do not need to be increased in multiple stages or the terminals do not need to be alternately installed so as to form different terminal heights, and thus there are advantageous effects in that the shape of the terminal can be simplified, and the manufacturing cost of the busbar assembly can be significantly reduced.

DESCRIPTION OF DRAWINGS

FIG. 1 is a view illustrating a motor according to an embodiment.

FIG. 2 is a view illustrating a busbar assembly according to the embodiment.

FIG. 3 is a view illustrating the busbar assembly and a stator.

FIG. 4 is a view illustrating connection ends of coils connected to terminals.

FIG. 5 is a view illustrating the coils wound around the stator.

FIG. 6 is a view illustrating locations of the connection ends of the coils illustrated in FIG. 5.

FIG. 7 is a view illustrating a busbar body.

FIG. 8 is a view illustrating an inner radius and an outer radius of the busbar body illustrated in FIG. 7.

FIG. 9 is a view illustrating a region in which electrodes of the terminals are disposed.

FIG. 10 is a perspective view illustrating the terminal.

FIG. 11 is a side view illustrating the terminal.

FIG. 12 is a view illustrating a sheet metal material.

FIG. 13 is a view illustrating locations of the electrodes of the terminals.

FIG. 14 is a view illustrating directions of the electrodes of the terminals.

FIG. 15 is a view illustrating locations of the electrodes in a circumferential direction.

FIG. 16 is a view illustrating the terminals.

FIG. 17 is a view illustrating the terminals as seen in a direction indicated by S of FIG. 16.

FIG. 18 is a view illustrating terminal holders.

FIG. 19 is a plan view which illustrates the busbar assembly and in which locations of the electrode holes are illustrated.

FIG. 20 and FIG. 21 are views illustrating a region in which the terminals are disposed.

FIG. 22 is a view illustrating the locations of the electrodes of the terminals in a radial direction.

MODES OF THE INVENTION

Hereinafter, exemplary embodiments of the present invention will be described in detail with reference to the accompanying drawings. Purposes, specific advantages, and novel features of the invention will be clear from exemplary embodiments and the following detailed descriptions in connection with the accompanying drawings. Moreover, terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. In addition, in descriptions of the invention, when detailed descriptions of related well-known technology are deemed to unnecessarily obscure the gist of the invention, they will be omitted.

FIG. 1 is a view illustrating a motor according to an embodiment. Referring to FIG. 1, the motor according to the embodiment may include a busbar assembly 100, a stator 200, a rotor 300, and a rotational shaft 400.

Referring to FIG. 1, the busbar assembly 100 is connected to coils 20 wound the stator 200. The busbar assembly 100 is a unit disposed on the stator 200 and configured to connect the coils 20 wound around the stator 200.

The stator 200 may be formed by stacking a plurality of steel plates including yokes having a ring shape and teeth disposed at equal angular intervals in a circumferential direction and protruding toward an inside thereof in a radius direction. The coils 20 configured to generate rotational magnetic fields may be wound around the teeth. Here, the stator 200 and the coils 20 may be insulated from each other by an insulator 10.

The rotor 300 is disposed inside the stator 200. The rotor 300 may be formed by a magnet being coupled to a rotor core, and in some cases, a rotor core and a magnet may also be integrally formed. In addition, the rotor 300 may be formed by a magnet being coupled to a circumferential surface of a rotor core or a magnet being inserted into a pocket of a rotor core.

When current is supplied to the coils 20 wound around the stator, electrical interactions are induced between the coils 20 and the rotor 300 to rotate the rotor 300. When the rotor 300 rotates, the rotational shaft 400 is rotated and power is provided.

A sensing magnet 500 is a unit coupled to the rotational shaft 400 to be in conjunction with the rotor 300 so as to detect a location of the rotor 10.

A sensor configured to detect a magnetic force of the sensing magnet 500 may be disposed on a printed circuit board 600. Here, the sensor may be a hall integrated circuit (IC). The sensor detects a change in N and S poles of the sensing magnet 500 to generate a sensing signal.

FIG. 2 is a view illustrating a busbar assembly according to the embodiment. Such a FIG. 2 is a view clearly illustrating only main features for the purpose of clear conceptual understanding of the embodiment, and as a result, various modifications are expected and the scope of the embodiment is not limited to specific shapes illustrated in the drawing.

Referring to FIG. 2, the busbar assembly 100 may include a terminal 110 and a busbar body 120.

The terminal 110 is a portion connected to the coil 20, and may be provided with a plurality of terminals 110. The busbar body 120 may be formed to be a frame type having a ring shape.

FIG. 3 is a view illustrating the busbar assembly and a stator, and FIG. 4 is a view illustrating connection ends of coils connected to terminals.

Referring to FIGS. 3 and 4, the busbar assembly 100 may be disposed on the stator 200. Some connection ends 21a among connection ends 21 of the coils 20 wound around the stator 200 may be connected to the terminals 110 for connecting the coils 20 wound around divided cores of the stator 200. Other connection ends 21b among the connection ends 21 of the coils 20 may be connected to neutral terminals 30. In addition, still other connection ends 21c among the connection ends 21 of the coils 20 may be directly connected to power terminals (not shown) having U-, V-, and W-phases.

FIG. 5 is a view illustrating the coils wound around the stator, and FIG. 6 is a view illustrating locations of the connection ends of the coils illustrated in FIG. 5.

Referring to FIGS. 5 and 6, some of the connection ends 21 of the coils 20 wound around the stator 200 may be disposed at different locations around a center C of the stator 200 in a radial direction. For example, a plurality of connection ends 21 may be divided and disposed on a plurality of tracks O1, O2, and O3 around the center C. Here, the center C may be a center of the stator 200. The connection ends 21 of the coils may be divided into connection ends located at an outermost side, connection ends located at a middle, and connection ends located at an innermost side.

Since the connection ends 21 of the coils 20 are divided and distributed on the tracks having different radii, the terminals 110 connected to the connection ends 21 of the coils 20 may be formed to have a more simple shape. That is, in a case in which the connection ends 21 of the coils 20 are located on the same track, the electrodes of the terminal 110 are located in multiple layers or formed to be bent due to a limitation of a coupling space, but in a case in which the connection ends 21 of the coils 20 are divided and distributed on different tracks, the shape of the terminal 110 may be designed to be simple.

FIG. 7 is a view illustrating a busbar body, and FIG. 8 is a view illustrating an inner radius and an outer radius of the busbar body illustrated in FIG. 7.

Referring to FIG. 7, the busbar body 120 may include a base 121 and terminal holders 122. The base 121 and the terminal holders 122 may only be separately described according to shapes and functional properties thereof, and may be one mold member in which the base 121 and the terminal holders 122 are vertically connected to each other.

Referring to FIG. 8, the base 121 may be formed to be a type of plate in a ring shape having an inner radius R1 and an outer radius R2. In addition, the base 121 may include electrode holes 123. The electrode holes 123 are disposed below the terminals 110 (see FIG. 4). In addition, the electrode holes 123 may be disposed to be arranged at locations of the electrodes 112 around the center C in the circumferential direction. Here, the center C may be a center of the busbar body 120.

Referring to FIGS. 3 and 8, the connection ends 21 of the coils 20 pass through the arranged corresponding electrode holes 123 and are located above the base 121. Bodies 111 of the terminals 110 are inserted into the terminal holders 122.

FIG. 9 is a view illustrating a region in which electrodes of the terminals are disposed, FIG. 10 is a perspective view illustrating the terminal, and FIG. 11 is a side view illustrating the terminal.

Referring to FIGS. 8 to 10, the electrodes 112 of all the terminals 110 are disposed between the inner radius R1 and the outer radius R2 of the base 121. That is, the terminals 110 may be coupled to the busbar body 120 such that all the electrodes 112 are disposed in a gap A (shadow region) between a reference line P1 formed along the inner radius R1 of the base 121 and a reference line P2 formed along the outer radius R2 of the base 121.

The electrodes 112 may be located such that the connection ends 21 of the coils 20 wound around the stator 200 are disposed at different locations around the center C of the stator 200 in a radial direction. In addition, the locations of the electrodes 112 may simplify the shape of the terminals 110.

Referring to FIGS. 11 and 12, the electrode 112 may be formed by both end portions of the body 111 being bent to have a hook shape. Here, the electrode 112 may be formed to be bent in a longitudinal direction of the body 111. In addition, the body 111 may be formed to be curved or bent to form an arc around the center C of the busbar body 120.

The electrodes 112 connected to both end portions of the body 111 and having the hook shape may be formed by the end portions of the body 111 being bent in a predetermined direction, such as a counterclockwise direction W. Here, the electrodes 112 of all the terminals 110 coupled to the busbar body 120 may be formed to be bent from the bodies 111 in the same direction.

This is for minimizing generation of scrap and simplifying a manufacturing process to reduce a manufacturing cost by equalizing sizes and shapes of the terminals 110 included in the busbar assembly 100. In addition, this is also for effectively ensuring a space for coupling to the connection ends 21 of the coils 20.

FIG. 12 is a view illustrating a sheet metal material.

Referring to FIGS. 10 and 12, the terminal 110 may be formed such that a width W1 of the body 111 having a belt shape is the same as a width W2 of the electrode. Here, an unfolded shape of a raw material 11 included in the terminal 110 may be a belt shape which does not have divided portions because the width W1 of a raw material 11a corresponding to the body 111 of the terminal 110 is the same as the width W2 of a raw material 11b corresponding to the electrode 112 of the terminal 110. In this case, a portion of a scrap 12 other than the raw material 11 may be minimized in a sheet metal material 10.

FIG. 13 is a view illustrating locations of the electrodes of the terminals.

Referring to FIGS. 8 and 13, all the electrodes of the plurality of terminals 110 are located in the gap A between the reference line P1 formed along the inner radius R1 of the base 121 and the reference line P2 formed along the outer radius R2 of the base 121. In addition, the electrodes 112 may be arranged on the plurality of tracks around the center C of the busbar body 120. The locations of the electrodes 112 correspond to the locations of the connection ends 21 of the coils 20. Accordingly, the connection ends 21 of the coils 20 passing through the electrode holes 123 from under the base 121 are located inside the electrodes 112 having the hook shape.

The terminals 110 are mainly divided into the terminals located at the outermost side, the terminals located at the middle, and the terminals located at the innermost side around the center C of the busbar body 120 in the radial direction. Two terminals 110 may be disposed on the same track. In addition, neutral terminals 30 may be disposed on the outermost side. The electrodes 31 of the neutral terminals 30 may also be disposed in the gap A between the reference line P1 formed along the inner radius R1 of the base 121 and the reference line P2 formed along the outer radius R2 of the base 121.

Meanwhile, the electrodes 112 of all the terminals 110 other than the neutral terminals 30 may be formed in the same shape. Particularly, all the shapes and sizes of the terminals 110 arranged on the same track may be the same.

FIG. 14 is a view illustrating directions of the electrodes of the terminals.

Referring to FIG. 14, a terminal 110A located at the outermost side may be disposed such that an electrode 112A protrudes inward toward the center C in the radial direction. Here, the center C may be the center of the busbar body 110 (see FIG. 8). In addition, terminals 110B located at the innermost side and terminals 110C located at the middle may be disposed such that the electrodes 112 protrude toward the outside from the center C in the radial direction. This is for placing all the electrodes 112 in the gap A between the reference line P1 and the reference line P2. In addition, this is also for effectively ensuring a space for coupling with the connection ends 21 of the coils 20 in a limited space of the busbar body 120.

FIG. 15 is a view illustrating locations of the electrodes in a circumferential direction.

Referring to FIG. 15, the electrodes 112 of all the terminal 110 may be arranged at different locations around the center C in the circumferential direction. For example, even the electrodes 112 disposed on the different tracks are also arranged at different locations in the circumferential direction. When the locations of the electrodes 112 arranged at the different tracks are C1, C2, and C3 in FIG. 15, locations of the terminals 110 may be determined such that the C1, C2, and C3 are different in the circumferential direction.

FIG. 16 is a view illustrating the terminals, and FIG. 17 is a view illustrating the terminals as seen in a direction indicated by S of FIG. 16.

The electrodes 112 of all the terminals 110 may be disposed at the same height. Here, the term "height" may be based on a direction parallel to a direction of the shaft of the motor. Referring to FIGS. 16 and 17 particularly, the electrodes 112 of all the terminals 110 may be disposed on a coplane h. Here, when a z-axis of FIG. 16 is the direction of the shaft of the motor, and an x-axis of FIG. 16 is a radial direction of the motor, the coplane h may be a plane formed in the radial direction of the motor.

FIG. 18 is a view illustrating terminal holders.

Referring to FIG. 18, the terminal holder 122 may be formed to perpendicularly protrude from the base 121. The terminal holder 122 includes a slot 122a into which the body 111 of the terminal 110 is inserted to serve to fix the terminal 110. The terminal holder 122 may be formed on the base 121 to arrange the slot 122a on the body 111 of the terminals 110.

For example, the terminal holder 122 may include a first sidewall 122b and a second sidewall 122c. The first sidewall 122b and the second sidewall 122c are formed to perpendicularly protrude from the base 121. In addition, the first sidewall 122b and the second sidewall 122c are disposed to be spaced a predetermined distance apart and face each other to form the slot 122a therebetween, wherein the body 111 of the terminal 110 is inserted into the slot 122a. Since the terminal holder 122 is formed to be a thin sidewall structure forming the slot 122a as described above, an amount of mold member forming the busbar body 120 may be significantly decreased.

FIG. 19 is a plan view which illustrates the busbar assembly and in which locations of the electrode holes are illustrated.

Referring to FIG. 19, all the electrode holes 123 formed in the base 121 may be arranged at different locations around the center C in the circumferential direction. For example, when reference locations of any electrode holes 123 arranged on the different tracks in the circumferential direction are L1, L2, and L3 of FIG. 19, the locations of electrode holes 123 may be determined such that the L1, L2, and L3 are different.

FIG. 20 and FIG. 21 are views illustrating a region in which the terminals are disposed.

All the terminals 110 may be coplanar. In addition, at least two terminals 110 among the plurality of terminals 110 may be disposed at different locations around the center C of the busbar body 120 in the radial direction, and the different locations may also be different in the circumferential direction.

Referring to FIG. 20, at least two terminals of the plurality of terminals 110 may be disposed at different locations in the radial direction first. That is, the terminals 110 may be arranged on the plurality of circular tracks O1, O2, and O3 around the center C of the busbar body 120. For example, any one terminal 110A may be disposed on the circular track O1 located at the outermost side in the radial direction. In addition, another terminal 110B may be disposed on the circular track O2 located at the middle in the radial direction.

In addition, at least two terminals of the plurality of terminals 110 may be disposed at different locations in the circumferential direction. For example, any one terminal 110B may be disposed in a first region S1 in the circumferential direction. In addition, another terminal 110A may be disposed in the circumferential direction in a second region S2 which is different from the first region S1.

Referring to FIG. 21, for example, any one terminal 110C may be disposed on the circular track O3 located on the innermost side in the radial direction. In addition, another terminal 110B may be disposed on the circular track O2 located at the middle in the radial direction. In addition, any one terminal 110C may be disposed in the third region S3 in the circumferential direction. In addition, another terminal 110B may be disposed in the circumferential direction in a fourth region S4 different from the third region S3.

While the embodiments have been described, locations of two terminals 110 have been compared to describe locations thereof. However, the present invention is not limited thereto, and two or more locations of the terminals 110 may also be different in the circumferential and radial directions.

FIG. 22 is a view illustrating the locations of the electrodes of the terminals in a radial direction.

Referring to FIG. 22, electrodes 112a, 112b, and 112c of the terminals 110 may be arranged to be located at different locations to be coplanar around the center C in the radial direction. For example, the electrodes 112a, 112b, and 112c of the terminals 110 may be arranged on the circular tracks O1, O2, and O3, respectively, which have different radii, around the center C. The circular tracks O1, O2, and O3 correspond to the locations of the connection ends 21 of the coils 20. Although not illustrated in the drawings, all the electrodes 112a, 112b, and 112c of the terminals 110 may be arranged at different locations around the center C in the radial direction.

As described above, the electrodes 112a, 112b, and 112c are located to be coplanar at different locations in the embodiments. Accordingly, heights of the busbars do not need to be increased in multiple stages or the terminals do not need to be alternately installed so as to form different heights of the terminals.

In addition, the electrodes 112a, 112b, and 112c of all the terminals 110 may be arranged to be located at different locations around the center C in the circumferential direction. When the locations of the electrodes 112a, 112b, and 112c arranged at different tracks are C3, C2, and C1 of FIG. 22, locations of the terminals 110A, 110B, and 110C may be determined such the C3, C2, and C1 are different.

As described above, the busbar assembly and the motor including the same according to one exemplary embodiment of the present invention have been specifically described with reference to the accompanying drawings.

While the present invention has been particularly described with reference to exemplary embodiments, it will be understood by those skilled in the art that various changes in form and detail may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

[Reference Numerals]

| | |
|---|---|
| 100: BUSBAR ASSEMBLY | 110: TERMINAL |
| 111: BODY | 112: ELECTRODE |
| 120: BUSBAR BODY | 121: BASE |
| 122: TERMINAL HOLDER | 123: ELECTRODE HOLE |
| 200: STATOR | 300: ROTOR |
| 400: ROTATIONAL SHAFT | |

The invention claimed is:

1. A busbar assembly comprising:
a busbar body having an inner radius and an outer radius; and
a plurality of terminals coupled to the busbar body, each terminal including a terminal body and electrodes, the terminal body having a pair of ends and being continuously arcuate between the pair of ends, an electrode connected to each of the pair of ends of the terminal body,
wherein each of the electrodes has a J-shape, with a first linear portion having a first end directly attached to one of the pair of ends of the terminal body and a second arcuate portion directly attached to and extending from a second end of the first linear portion,
wherein all of the electrodes of the plurality of the terminals are disposed in an area between the inner radius and the outer radius,
wherein each of the plurality of terminals has a top edge of the terminal body at a same height as a top edge of the electrodes, and
wherein at least two terminals among the plurality of the terminals are disposed at different locations around a center of the busbar body in radial and circumferential directions.

2. The busbar assembly of claim 1, wherein the electrodes of the at least two terminals of the plurality of the terminals are located at different locations around the center of the busbar body in the radial direction.

3. The busbar assembly of claim 2, wherein:
the busbar body includes at least one electrode hole; and
the at least one electrode hole is disposed below the electrode of the terminal and disposed around the center of the busbar body in the circumferential direction at a location corresponding to the electrode of the terminal.

4. The busbar assembly of claim 2, wherein all the electrodes of the plurality of the terminals are disposed at different locations around the center of the busbar body in the circumferential direction.

5. The busbar assembly of claim 2, wherein:
the terminal body has a belt shape; and
the electrodes are formed by bending opposite end portions of the terminal body along an extending direction of the terminal body where the end portions of the terminal body extend along a longitudinal direction of the terminal body.

6. The busbar assembly of claim 5, wherein the electrodes formed at the opposite end portions of the terminal body are formed to be bent in the same direction.

7. The busbar assembly of claim 5, wherein the electrode disposed at an outermost side around the center of the busbar in the radial direction protrudes inward.

8. The busbar assembly of claim 5, wherein the electrode disposed at an innermost side around the center of the busbar in the radial direction protrudes toward an outside.

9. The busbar assembly of claim 2, wherein all the electrodes of the plurality of the terminals are disposed at the same height.

10. The busbar assembly of claim 2, wherein the plurality of the terminals comprise at least a first terminal, a second terminal and a third terminal which are disposed at different locations around a center of the busbar body in the radial direction.

11. A busbar assembly comprising:
a busbar body having an inner radius and an outer radius; and
a plurality of terminals coupled to the busbar body, each terminal including a terminal body and electrodes,
wherein the electrodes of the plurality of the terminals are located on three different circular tracks between the inner radius and the outer radius,
wherein the busbar body comprises a plate like base and terminal holders extending perpendicularly upwardly from the base, the terminal body being inserted into the terminal holder, and
wherein the terminal body has a belt shape, and the electrodes are formed in a hook shape by bending the opposite end portions of the terminal body along an extending direction of the terminal body.

12. A motor comprising:
a busbar assembly comprising:
a busbar body having an inner radius and an outer radius; and
a plurality of terminals coupled to the busbar body, each terminal including a terminal body and electrodes,
wherein the terminal bodies of the plurality of the terminals are located on three different circular tracks between the inner radius and the outer radius, each circular track being at a constant radial distance from a center of the busbar body,
wherein the busbar body comprises a plate like base and terminal holders extending perpendicularly to the base, the terminal body of each terminal being inserted into the terminal holder, and
wherein the terminal body has a belt shape, and the electrodes are formed in a hook shape by bending the opposite end portions of the terminal body along an extending direction of the terminal body;

a stator including a coil connected to the busbar assembly;
a rotor disposed inside the stator; and
a rotational shaft coupled to the rotor.

13. The busbar assembly of claim 11, wherein each terminal holder comprises two walls extending upwardly from the base, the busbar body fitting between the two walls.

14. The busbar assembly of claim 11, further comprising a neutral terminal comprising a plurality of electrodes coupled to the busbar body and disposed on an outermost side of the busbar body.

15. The busbar assembly of claim 14, wherein at least two terminals among the plurality of the terminals are disposed at different locations around a center of the busbar body in radial and circumferential directions.

16. The busbar assembly of claim 15, wherein shapes and sizes of all the terminals other than the neutral terminal arranged on a same track are the same.

* * * * *